United States Patent
Fujinaka et al.

(10) Patent No.: US 12,535,847 B2
(45) Date of Patent: Jan. 27, 2026

(54) PEDAL DEVICE

(71) Applicant: DENSO CORPORATION, Kariya (JP)

(72) Inventors: Yuta Fujinaka, Kariya (JP); Soichi Kinouchi, Kariya (JP); Hideaki Ichihara, Kariya (JP); Kohtaroh Hirasawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 16 days.

(21) Appl. No.: 18/673,077

(22) Filed: May 23, 2024

(65) Prior Publication Data

US 2024/0319758 A1    Sep. 26, 2024

Related U.S. Application Data

(63) Continuation of application No. PCT/JP2022/042565, filed on Nov. 16, 2022.

(30) Foreign Application Priority Data

Nov. 25, 2021    (JP) ................................ 2021-191004

(51) Int. Cl.
     *G05G 1/44*          (2008.04)
     *H02P 23/00*       (2016.01)
     *H02P 23/14*       (2006.01)

(52) U.S. Cl.
     CPC ........... *G05G 1/44* (2013.01); *H02P 23/0077* (2013.01); *H02P 23/14* (2013.01); *G05G 2505/00* (2013.01)

(58) Field of Classification Search
None
See application file for complete search history.

(56) References Cited

U.S. PATENT DOCUMENTS 5,568,797 A * 10/1996 Landerretche ....... B60K 26/021
                                                       123/396
2012/0143441 A1    6/2012   Yamazaki et al.
2022/0140766 A1    5/2022   Shouji et al.

FOREIGN PATENT DOCUMENTS

JP        2016163483 A * 9/2016 ............... G05G 5/03
JP        6413166 B2    10/2018

* cited by examiner

*Primary Examiner* — Vicky A Johnson
(74) *Attorney, Agent, or Firm* — Nixon & Vanderhye P.C.

(57) ABSTRACT

A pedal device includes a pedal lever, an actuator, and a control unit. The pedal lever operates in response to a pedal operation. The actuator can apply a reaction force that is a force in a direction of returning the pedal lever by driving a motor. The control unit includes a current command calculation section that calculates a current command value based on a reaction force target value related to a reaction force applied to the pedal lever and a duty calculation section that calculates a duty command value based on the current command value, and controls a drive of a motor based on the duty command value. The duty calculation section corrects the duty command value based on at least one of a motor current supplied to the motor and a rotation speed of the motor.

20 Claims, 15 Drawing Sheets

PEDAL DEVICE

CROSS REFERENCE TO RELATED APPLICATIONS

This application is a continuation application of International Patent Application No. PCT/JP2022/042565 filed on Nov. 16, 2022, which designated the U.S. and based on and claims the benefits of priority of Japanese Patent Application No. 2021-191004 filed on Nov. 25, 2021. The entire disclosure of all of the above applications is incorporated herein by reference.

TECHNICAL FIELD

The present disclosure relates to a pedal device.

BACKGROUND

Conventionally, an accelerator pedal device including a reaction force output device is known.

SUMMARY

An object of the present disclosure is to provide a pedal device that can appropriately control a reaction force.

A pedal device of the present disclosure includes a pedal lever, an actuator, and a control unit. The pedal lever operates in response to a depression operation. The actuator can apply a reaction force that is a force in a direction of returning the pedal lever by driving a motor. The control unit includes a current command calculation section that calculates a current command value based on a reaction force target value related to a reaction force applied to the pedal lever and a duty calculation section that calculates a duty command value based on the current command value, and controls a drive of the motor based on the duty command value.

The duty calculation section corrects the duty command value based on at least one of a motor current supplied to the motor and a rotation speed of the motor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
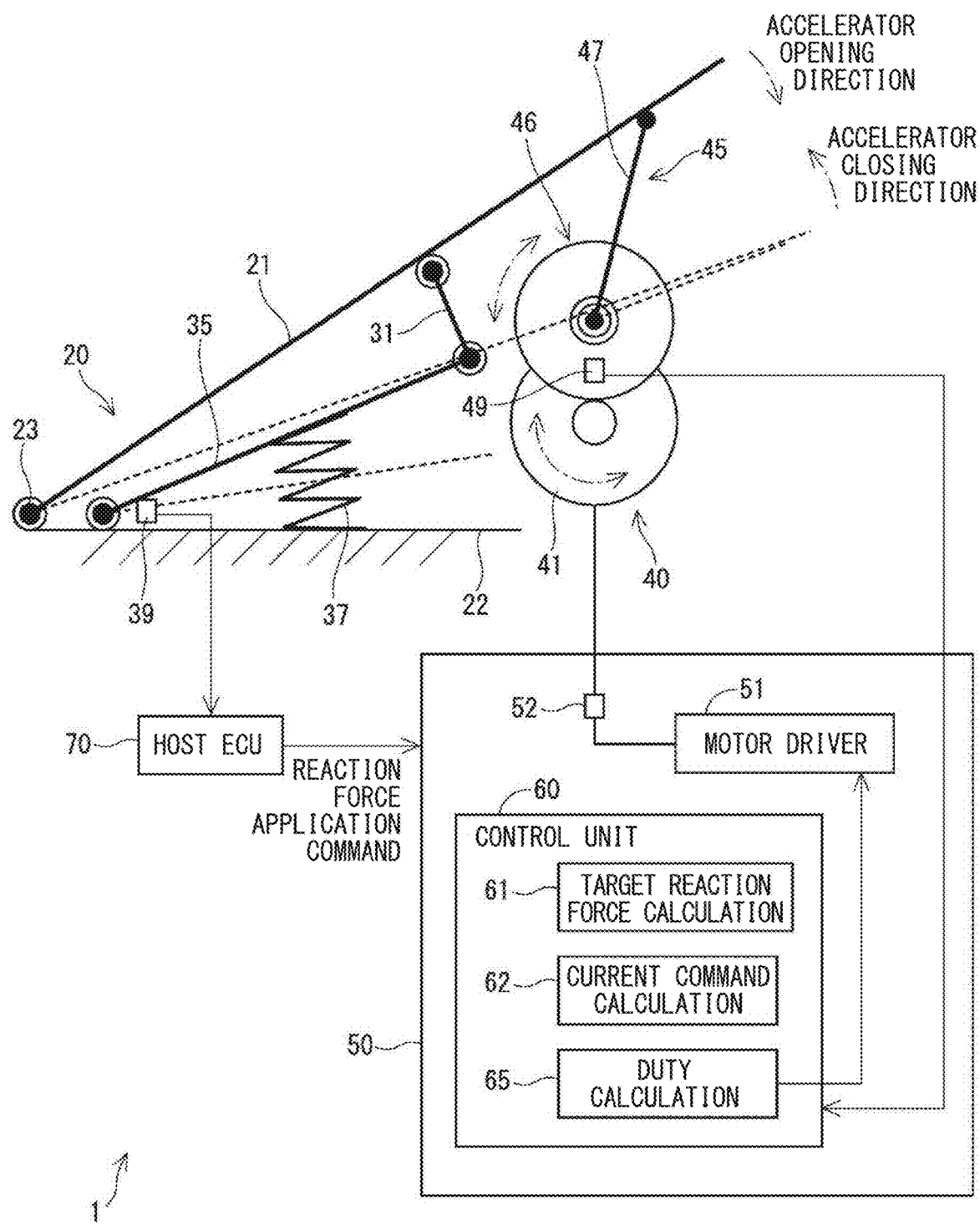
FIG. 1 is a schematic diagram showing a pedal device according to a first embodiment.

In an assumable example, an accelerator pedal device including a reaction force output device is known. For example, when a motor rotation speed does not exceed a threshold value, an energization is controlled with a duty ratio based on a reaction force setting value, and when the motor rotation speed exceeds the threshold value, the energization is controlled with a duty ratio according to the rotation speed.

However, it is not possible to correct minute changes in the rotation speed, and there is a possibility that reaction force fluctuations cannot be suppressed. An object of the present disclosure is to provide a pedal device that can appropriately control a reaction force.

A pedal device of the present disclosure includes a pedal lever, an actuator, and a control unit. The pedal lever operates in response to a depression operation. The actuator can apply a reaction force that is a force in a direction of returning the pedal lever by driving a motor. The control unit includes a current command calculation section that calculates a current command value based on a reaction force target value related to a reaction force applied to the pedal lever and a duty calculation section that calculates a duty command value based on the current command value, and controls a drive of the motor based on the duty command value.

The duty calculation section corrects the duty command value based on at least one of a motor current supplied to the motor and a rotation speed of the motor. Thereby, the reaction force can be appropriately controlled.

Hereinafter, a pedal device according to the present disclosure will be described based on the drawings. In the following plural embodiments, substantially same structural configurations are designated with the same reference numerals thereby to simplify the description.

First Embodiment

A first embodiment is shown in FIGS. 1 to 11. As shown in FIG. 1, a pedal device 1 includes a pedal lever 20, an actuator 40, a motor control unit 50, and the like.

The pedal lever 20 includes a pad 21, an arm 31, and a pedal 35, and is integrally driven by a driver's depression operation or the like. The pad 21 is provided to be operable by the driver's depression operation. The pad 21 is rotatably supported by a fulcrum member 23 provided on a housing 22. FIG. 1 illustrates a so-called floor type (organ type) pedal in which the pad 21 is provided to extend in a direction along one surface of the housing 22. However, a suspension type (pendant type) pedal may be used. In the present embodiment, the housing portions such as a pedal housing and a motor housing that are not driven by operation of a motor 41 or a depression operation of the pedal lever 20 are collectively referred to as a housing 22.

The arm 31 connects the pad 21 and the pedal 35. One end of the pedal 35 is rotatably supported by the housing 22, and the other end of the pedal 35 is connected to the arm 31. With this arrangement, the pad 21, the arm 31, and the pedal 35 are integrally driven by an operation of the pad 21 by the driver. A pedal opening degree sensor 39 that detects a pedal opening degree is provided on one end side of the pedal 35. A detected value of the pedal opening degree sensor 39 is output to a host ECU 70.

A pedal biasing member 37 is a compression coil spring and is configured to bias the pedal 35 in an accelerator closing direction. One end of the pedal biasing member 37 is fixed to the pedal 35 and the other end of the pedal biasing member 37 is fixed to the housing 22. In FIG. 1, the solid lines depict a state of fully closed acceleration, and the broken lines depict a state of fully opened acceleration.

The actuator 40 includes the motor 41 and a power transmission mechanism 45. The drive of the motor 41 is controlled by a motor control unit 50. The motor 41 of the present embodiment is a brushed DC motor. The driving force of the motor 41 is transmitted to the pedal lever 20 via the power transmission mechanism 45. For example, the actuator 40 is made to include a series of components that transmits power from the motor 41 as a drive source to the pedal lever 20 via the power transmission mechanism 45.

The power transmission mechanism 45 includes a gear set 46, an actuator lever 47, and the like. The gear set 46 is configured with a motor gear that rotates integrally with a motor shaft, and a plurality of gears that mesh with the motor gear. The gear set 46 transmits the driving force of the motor 41 to the actuator lever 47. One of the gears constituting the gear set 46 is provided with a position sensor 49 that detects the rotational position.

The actuator lever 47 has one end connected to the gear set 46 and the other end abutted against the pedal lever 20. Thereby, the driving force of the motor 41 is transmitted to the pedal lever 20 via the power transmission mechanism 45. In FIG. 1, the other end of the actuator lever 47 is in contact with the pad 21, but may be in contact with the arm 31 or the pedal 35. Further, when no reaction force is applied, the actuator lever 47 and the pedal lever 20 may be configured to be separated from each other, or may be configured to be in constant contact with each other.

When the motor 41 is rotated in a state where the actuator lever 47 and the pedal lever 20 are in contact with each other, a reaction force in a push-back direction can be applied to the pedal lever 20. Hereinafter, the direction of rotation of the motor 41 and the direction of energization toward the side that increases the reaction force applied to the pedal lever 20 is defined as positive.

By actively applying a reaction force in the push-back direction to the pedal lever 20 by the motor 41, for example, by applying a reaction force to provide a sense of wall when a fuel consumption is determined to be deteriorated when the driver depresses the pad 21, on the basis of the driving situation, the depression of the pad 21 by the driver is prevented or reduced. Accordingly, a fuel efficiency can be improved. Further, for example, by pulse-driving the pedal lever 20 in the push-back direction, the pulse-driving can be used to transmit information such as notification of switching from automatic driving to manual driving.

The motor control unit 50 includes a motor driver 51, a current sensor 52, a control unit 60, and the like. The motor driver 51 has a switching element (not shown) that switches energization to the motor 41. Although the motor driver 51 of the present embodiment is an H-bridge circuit, it may be a half-bridge circuit that can be energized in a direction of applying the reaction force. The current sensor 52 detects the current applied to motor 41.

The control unit 60 is mainly composed of a microcomputer and the like, and internally includes, although not shown in the figure, a CPU, a ROM, a RAM, an I/O, a bus line for connecting these components, and the like. Each process executed by each of the control unit 60 may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit.

The control unit 60 includes a target reaction force calculation section 61, a current command calculation section 62, a duty calculation section 65, etc. as functional blocks. In FIG. 1, each functional block is shown as being configured by one control unit 60, but some of the functions may be configured in a separate control unit, or at least a portion may be included on the host ECU 70 side.

The control unit 60 acquires the detected values of the position sensor 49 and the current sensor 52, and uses them for various calculations. The detected value of the position sensor 49 can be converted into the rotation angle of the motor 41 by converting the gear ratio, and the control unit 60 can calculate the motor rotation speed Nr, which is the rotation speed of the motor 41. The control unit 60 can calculate the current detection value Ir based on the detected value of the current sensor 52.

Further, when an abnormality occurs in the current sensor 52, the control unit 60 can estimate an amount of current change based on the motor rotation speed Nr. The control unit 60 can estimate the motor rotation speed Nr from the information from the current sensor 52 when an abnormality occurs in the position sensor 49.

The target reaction force calculation section 61 calculates a reaction force target value Pt based on a reaction force application command from the host ECU. The current command calculation section 62 calculates a current command value It based on the reaction force target value Pt. The duty calculation section 65 calculates a duty command value Dt related to a duty ratio of the PWM signal.

Figure 2A:
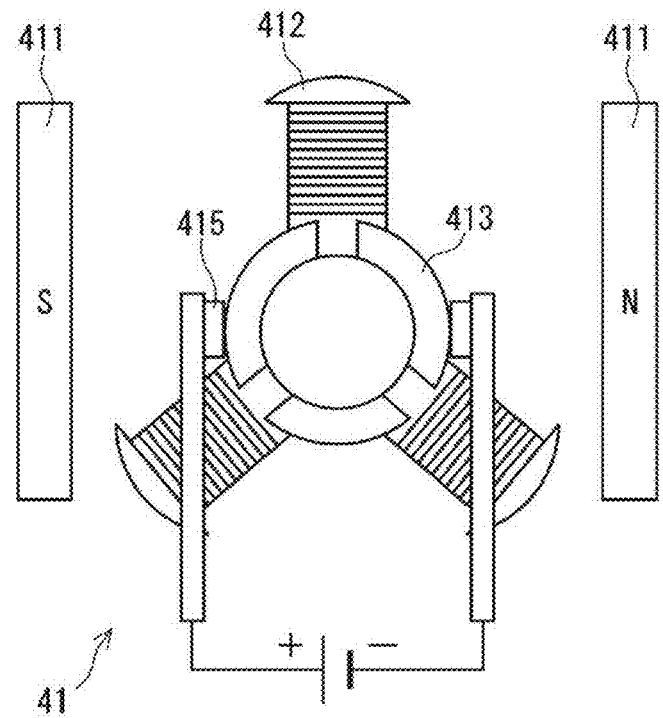
FIG. 2A is a schematic diagram showing a state in which a brush does not straddle a commutator.
Figure 2B:
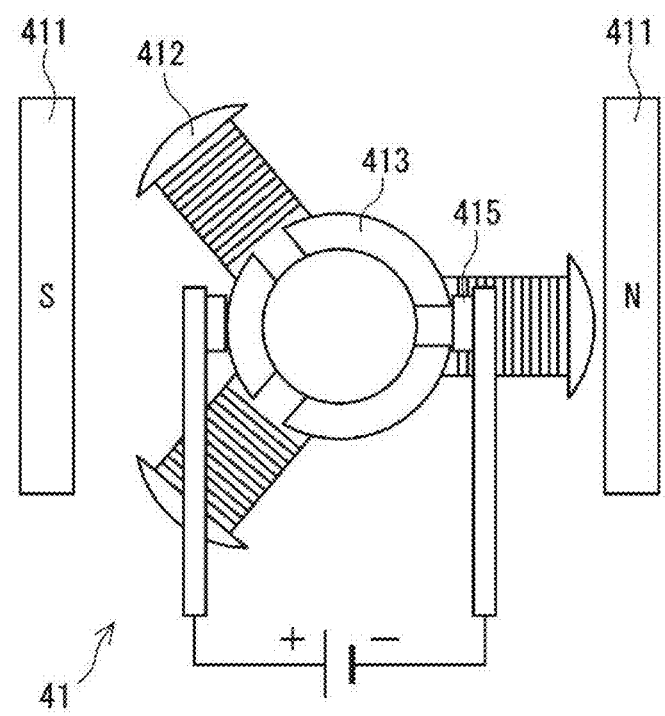
FIG. 2B is a schematic diagram showing a state in which a brush straddles a commutator.
Figure 3A:
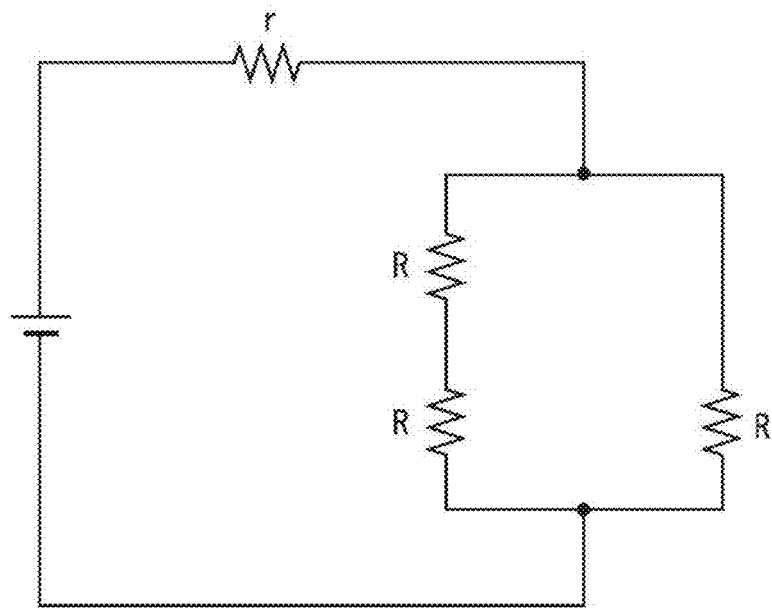
FIG. 3A is a circuit diagram showing a state in which the brush does not straddle the commutator.
Figure 3B:
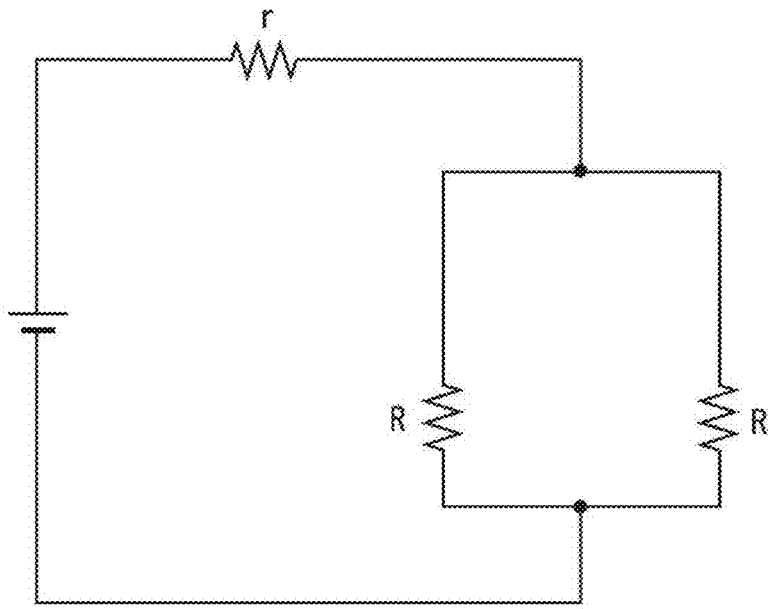
FIG. 3B is a circuit diagram showing a state in which the brush straddles the commutator.

A structure of the brushed motor is shown in FIGS. 2A and 2B, and a circuit diagram thereof is shown in FIGS. 3A and 3B. As shown in FIGS. 2A and 2B, the motor 41 includes a stator 411, a rotor 412, a commutator 413, and brushes 415.

As shown in FIG. 2A, when the brush 415 does not straddle the commutator 413, an electric circuit becomes as shown in FIG. 3A, and a motor resistance becomes R×(3/2). Further, as shown in FIG. 2B, when the brush 415 straddles the commutator 413, the electric circuit becomes as shown in FIG. 3B, and the motor resistance becomes R. In FIGS. 3A and 3B, r corresponds to the harness resistance, contact resistance, etc., and R corresponds to the resistance of the winding wound around the rotor 412.

Here, regarding the torque generated by the motor 41, a motor motion equation is shown in equation (1), and a motor electric equation is shown in equation (2). In the equation, ω is a motor rotation speed [rad/s], Km is a motor torque constant [N·m], I is a motor current [A], Tr is a load torque [N·m], and Td is a detent torque [N·m], B is a viscous friction constant [N·m/(rad/s)], V is a motor voltage [V], R is a resistance [Ω], and Ke is a back electromotive force constant [V/(rad/s)], θ is a motor rotation angle [rad], and L is an inductance [H].

$$dw/dt = 1/J \times (Km \times I - Tr - Td - B \times \omega) \quad (1)$$

$$dI/dt = 1/L \times (V - R(\theta) \times L - Ke \times \omega)$$

$$I = 1/R(\theta) \times (-dI/dt \times L + V - Ke \times \omega) \quad (2)$$

As shown in FIGS. 2A, 2B, 3A, and 3B, the motor 41 is a brushed motor, and the resistance changes depending on the motor rotation angle. Therefore, the motor current I is influenced not only by the motor rotation speed w but also by the resistance R(θ) (see equations (1) and (2)).

Further, the motor 41 of the present embodiment applies a reaction force to the pedal lever 20, and when the pedal lever 20 is depressed while applying the reaction force, the current changes due to the generation of a back electromotive force. That is, the motor current I changes depending on the resistance R(θ) corresponding to the motor rotation angle θ and the back electromotive force generated by depressing the pedal lever 20. Therefore, in the present embodiment, the duty command value Dt is corrected according to the motor current I.

Figure 4:
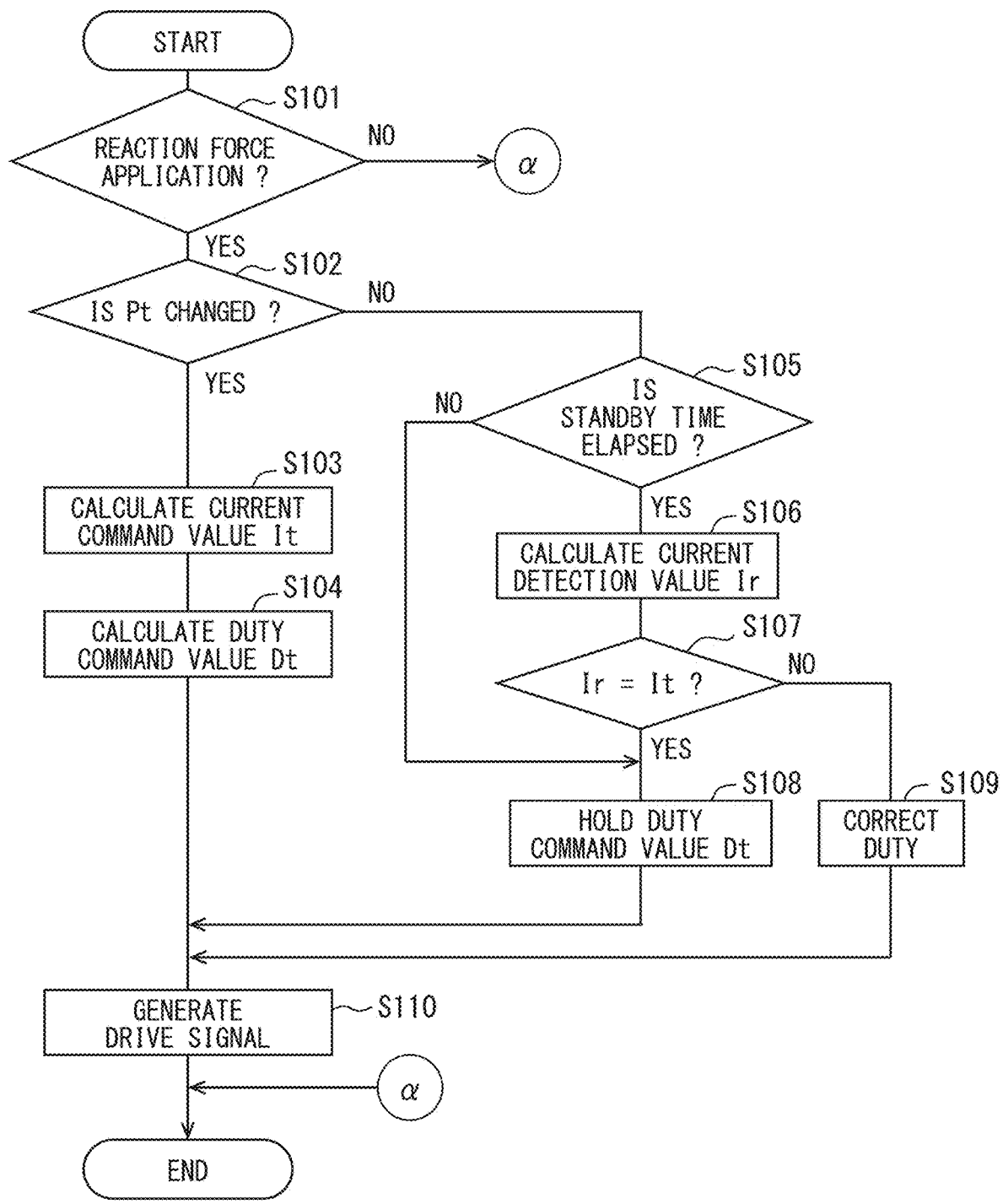
FIG. 4 is a flowchart illustrating a motor control process according to the first embodiment.

The motor control process according to the present embodiment will be described with reference to a time chart of FIG. 4. This process is executed by the control unit 60 in a process cycle. Hereinafter, "step" in step S101 is omitted, and is simply referred to as a symbol "S".

In S101, the control unit 60 determines whether there is a reaction force application command. When the control unit 60 determines that there is no reaction force application command (S101: NO), the processes after S102 are skipped. When it is determined that there is the reaction force application command (S101: YES), the process proceeds to S102.

In S102, the control unit 60 determines whether the reaction force target value Pt has been changed from the value in the previous calculation. When it is determined that the reaction force target value Pt has not been changed (S102: NO), the process proceeds to S105. When it is determined that the reaction force target value Pt has been changed (S102: YES), the process proceeds to S103.

Figure 5:
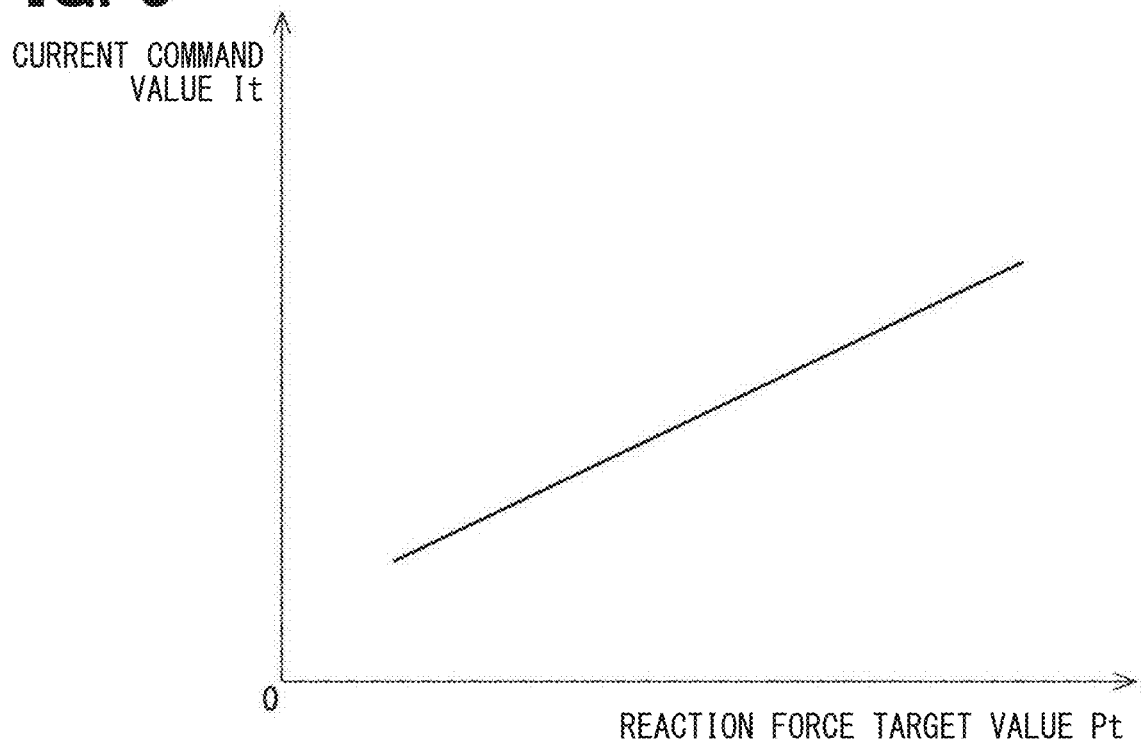
FIG. 5 is a map used for calculating a current command value from a reaction force target value in the first embodiment.
Figure 6:
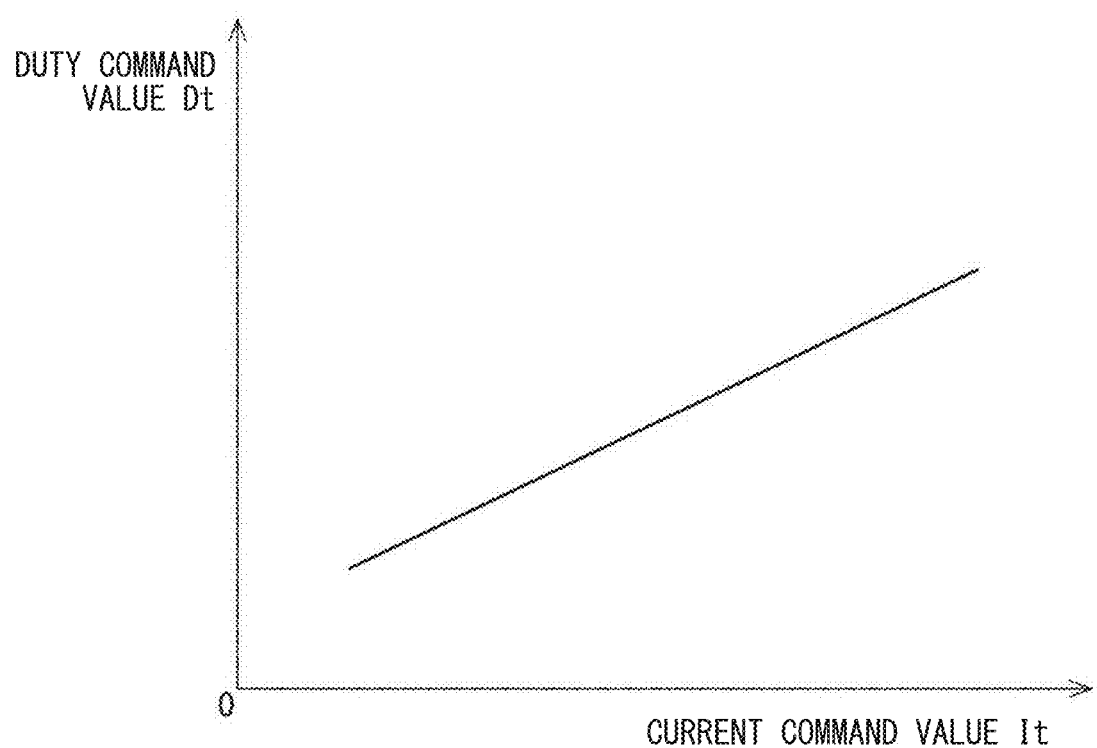
FIG. 6 is a map used for calculating a duty command value from a current command value in the first embodiment.

In S103, the current command calculation section 62 calculates the current command value It based on the reaction force target value Pt using, for example, the map shown in FIG. 5. In S104, the duty calculation section 65 calculates the duty command value Dt based on the current command value It using, for example, the map shown in FIG. 6.

In S105, which is proceeded to when the reaction force target value Pt has not been changed from the value in the previous calculation, it is determined whether a standby time has elapsed since the reaction force target value Pt was changed. The standby time is set according to the time required for the current value to reach a value corresponding to the reaction force target value Pt after the reaction force target value Pt is changed. When it is determined that the standby time has not elapsed since the reaction force target value Pt was changed (S105: NO), the process proceeds to S108 and the current duty command value Dt is held. When it is determined that the standby time has elapsed since the reaction force target value Pt was changed (S105: YES), the process proceeds to S106 and the current detection value Ir is calculated.

In S107, the control unit 60 determines whether the current detection value Ir and the current command value It match. Here, when a current deviation ΔI (see formula (3)), which is a difference between the current command value It and the current detection value Ir, is within a predetermined range set according to a detection error, etc., it is assumed that the current detection value Ir and the current command value It match. When it is determined that the current detection value Ir and the current command value It match (S107: YES), the process proceeds to S108 and the current duty command value Dt is held. When it is determined that the current detection value Ir and the current command value It do not match (S107: NO), the process proceeds to S109.

In S109, the duty calculation section 65 corrects the duty command value Dt. In the present embodiment, the duty correction amount ΔD is calculated based on the current deviation ΔI, and the duty command value Dt is corrected (see equation (4)). In the equations, the subscript (n) means a current value, and (n−1) means a previous value.

$$\Delta I = Ir - It \quad (3)$$

$$Dt(n) = Dt(n-1) - \Delta D \quad (4)$$

Figure 7:
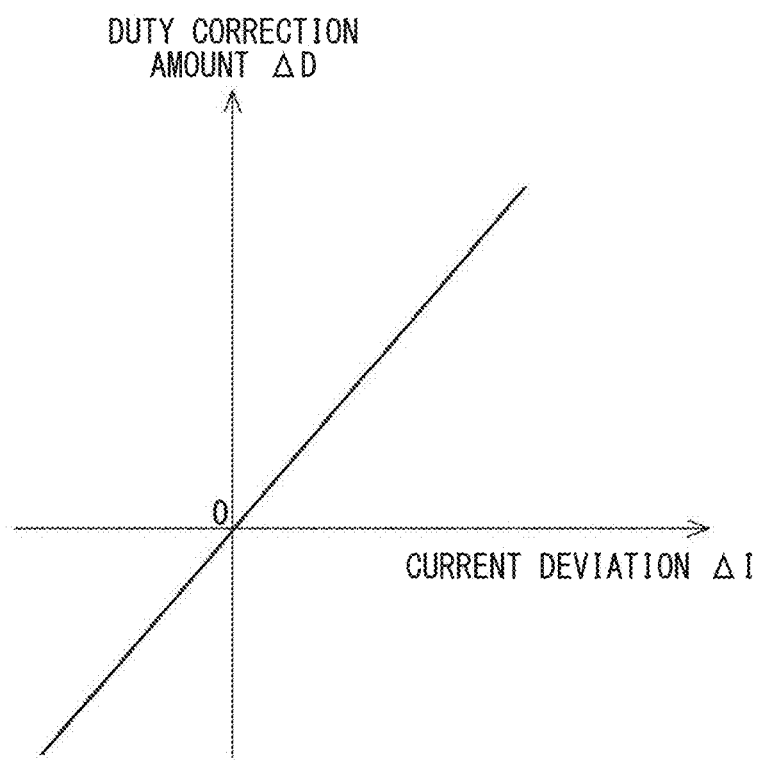
FIG. 7 is a map used for calculating a duty correction amount from a current deviation in the first embodiment.
Figure 8:
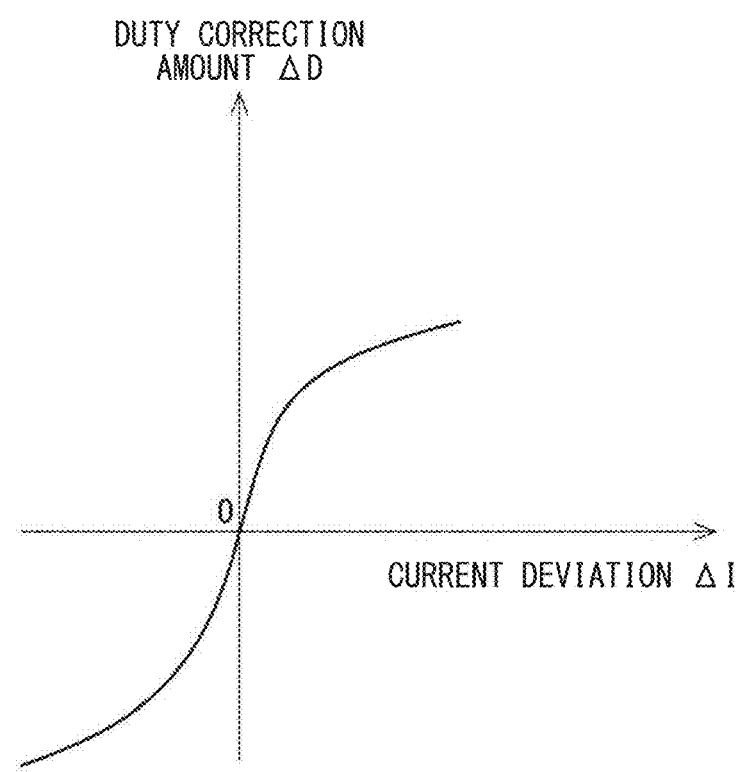
FIG. 8 is a map used for calculating a duty correction amount from a current deviation in the first embodiment.

The duty correction amount ΔD will be explained based on FIGS. 7 to 10. For example, as shown in FIGS. 7 and 8, the duty correction amount ΔD is calculated so that the duty command value Dt is corrected over the entire range of the current deviation ΔI. Thereby, even if a disturbance or a torque fluctuation occurs depending on the motor rotation angle θ, the control is performed so as to approach the reaction force target value Pt, so that drivability can be improved. The duty correction amount ΔD may be calculated using a linear function as shown in FIG. 7, or may be calculated using a non-linear function as shown in FIG. 8.

Figure 9:
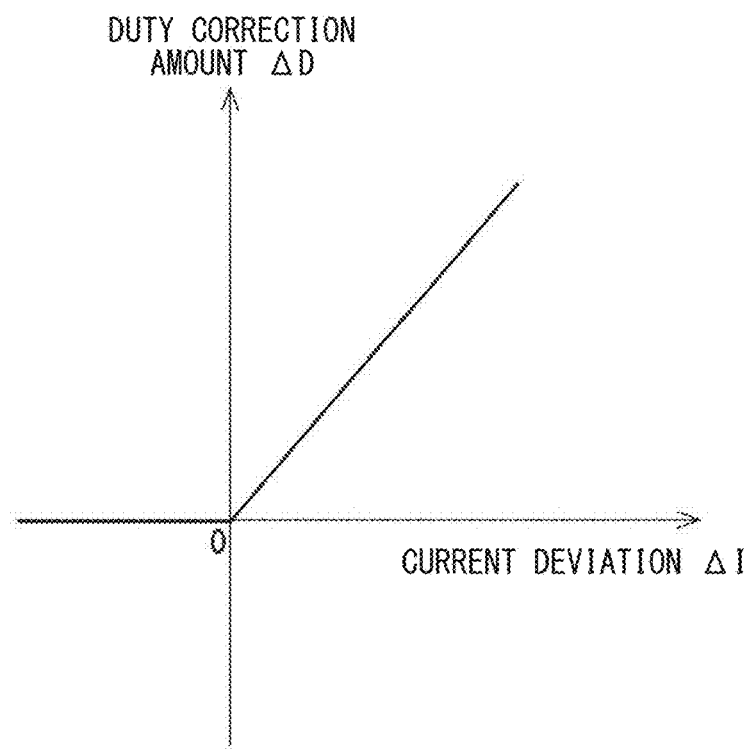
FIG. 9 is a map used for calculating a duty correction amount from a current deviation in the first embodiment.

When the pedal lever 20 is depressed against the additional reaction force from the actuator 40 side, the motor current increases due to the back electromotive force, so the current deviation ΔI becomes positive and the reaction force increases more than the target reaction force. In a region where the current deviation ΔI is positive, the duty correction amount ΔD is made positive, and the duty command value Dt is corrected to be deceased. Alternatively, as shown in FIG. 9, the duty command value Dt may be corrected to reduce the reaction force in the region where the current deviation ΔI is positive, and the duty correction may not be performed in the region where the current deviation ΔI is negative.

Figure 10:
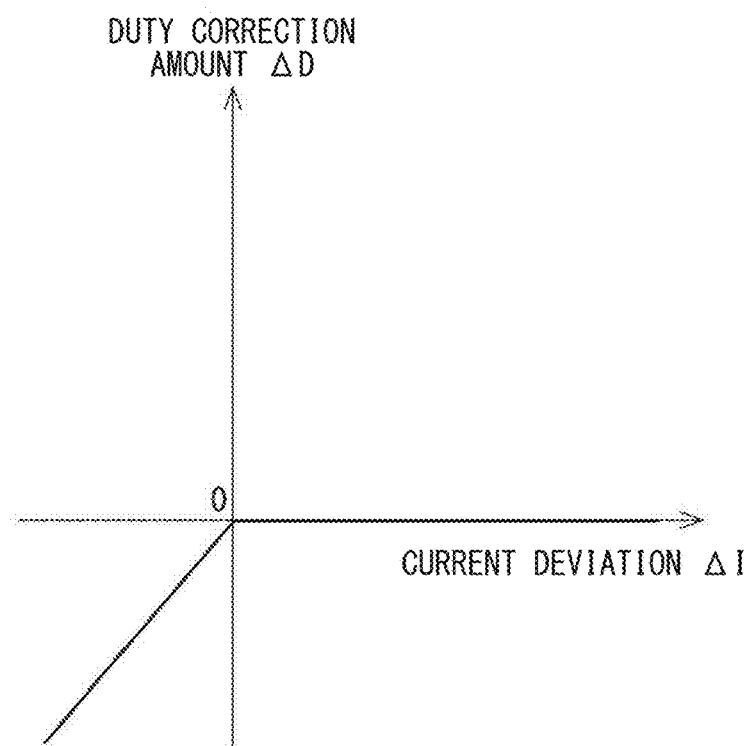
FIG. 10 is a map used for calculating a duty correction amount from a current deviation in the first embodiment.

When the pedal lever 20 is pressed back, the motor current decreases, so the current deviation ΔI becomes negative, and the reaction force decreases below the target reaction force. In a region where the current deviation ΔI is negative, the duty correction amount ΔD is made negative, and the duty command value Dt is corrected to be increased. Further, as shown in FIG. 10, the duty command value may be corrected to increase the reaction force in a region where the current deviation ΔI is negative, and the duty correction may not be performed in a region where the current deviation ΔI is positive. Although FIGS. 9 and 10 show an example of a linear function, a nonlinear function may also be used. Further, the duty correction amount ΔD may be calculated by a function calculation based on the current deviation ΔI without using the maps shown in FIGS. 7 to 10. The same applies to FIGS. 15 and 16, which will be described later.

Figure 11:
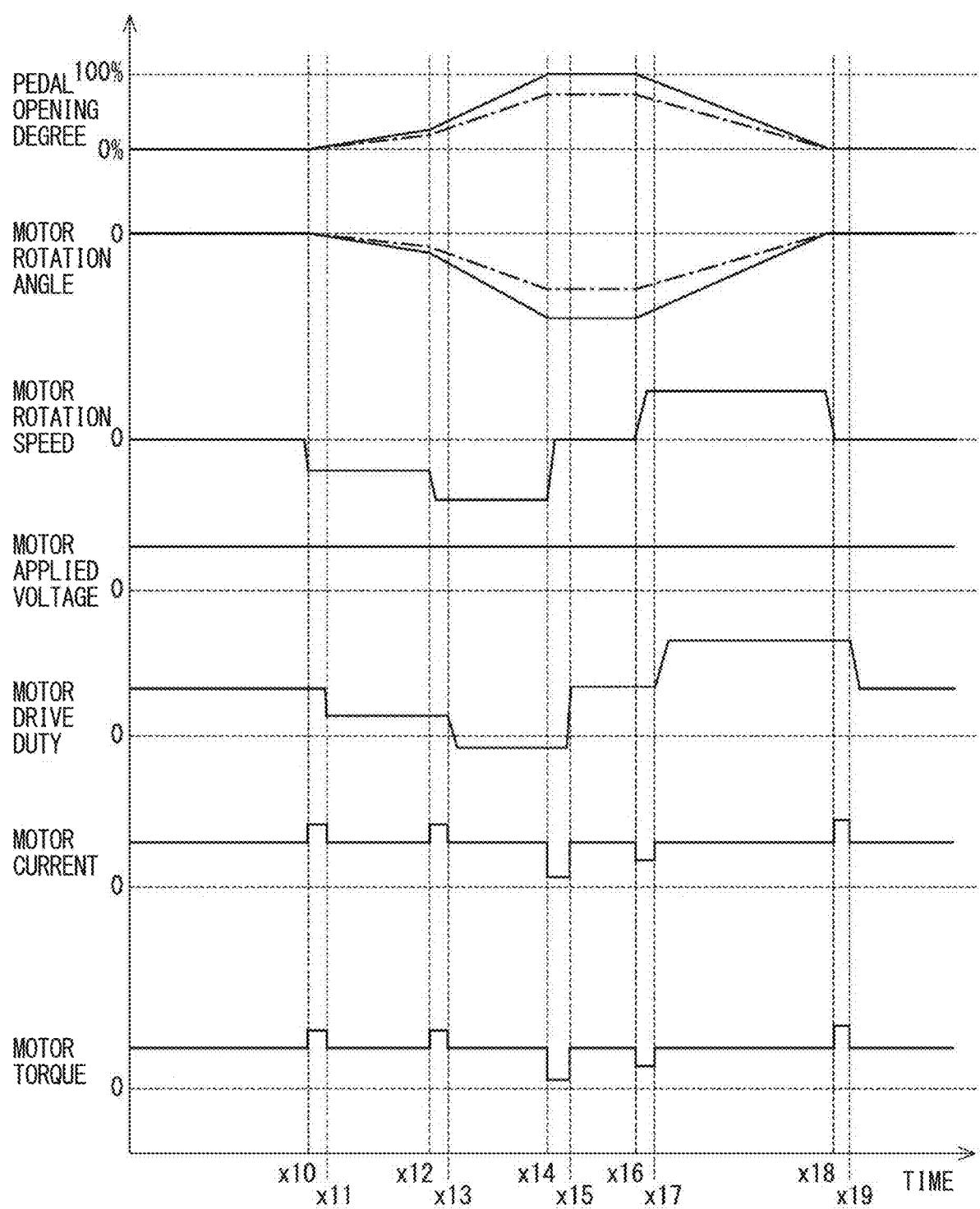
FIG. 11 is a time chart illustrating motor control process according to the first embodiment.
Figure 12:
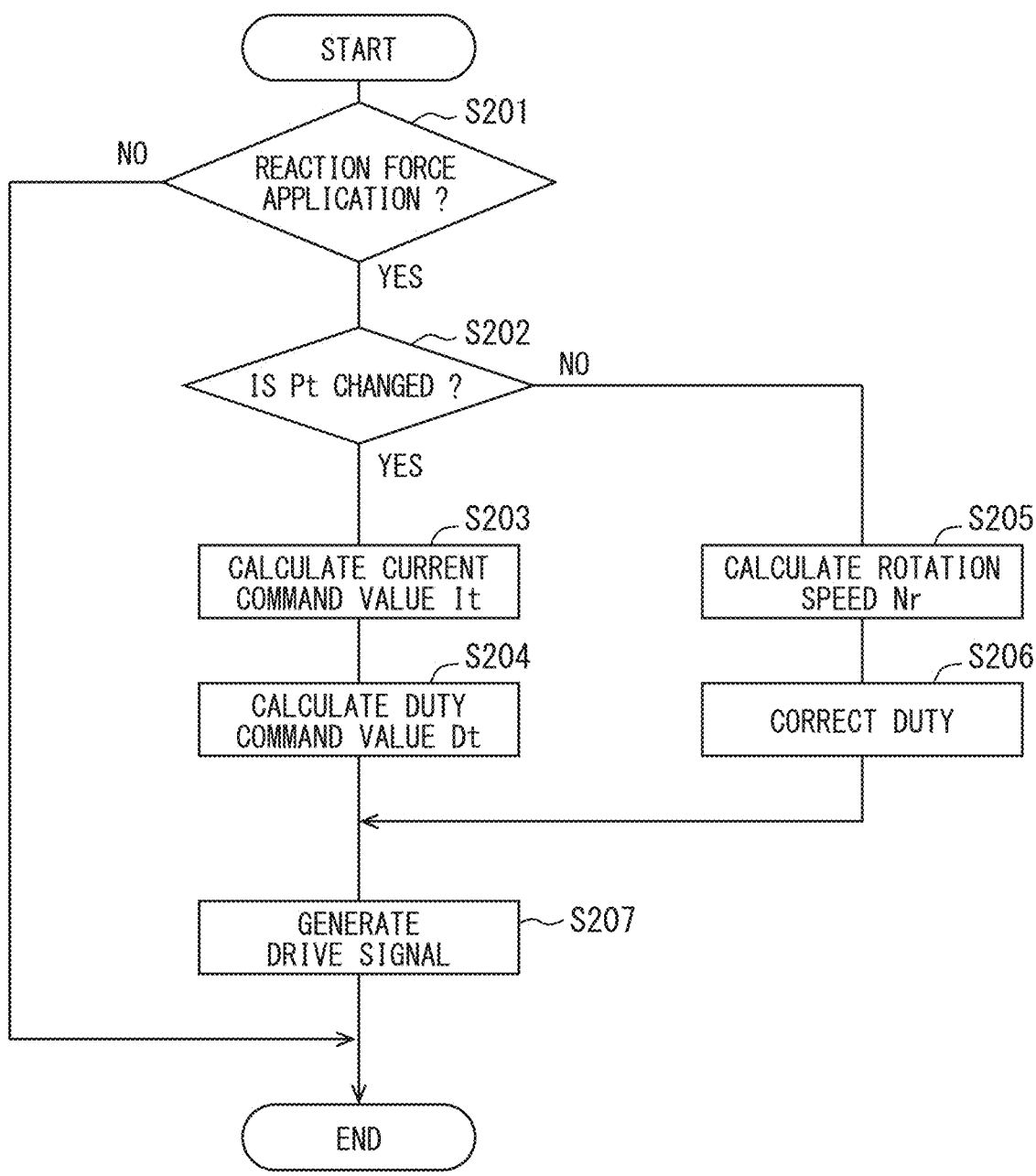
FIG. 12 is a flowchart illustrating a motor control process according to a second embodiment.
Figure 19:
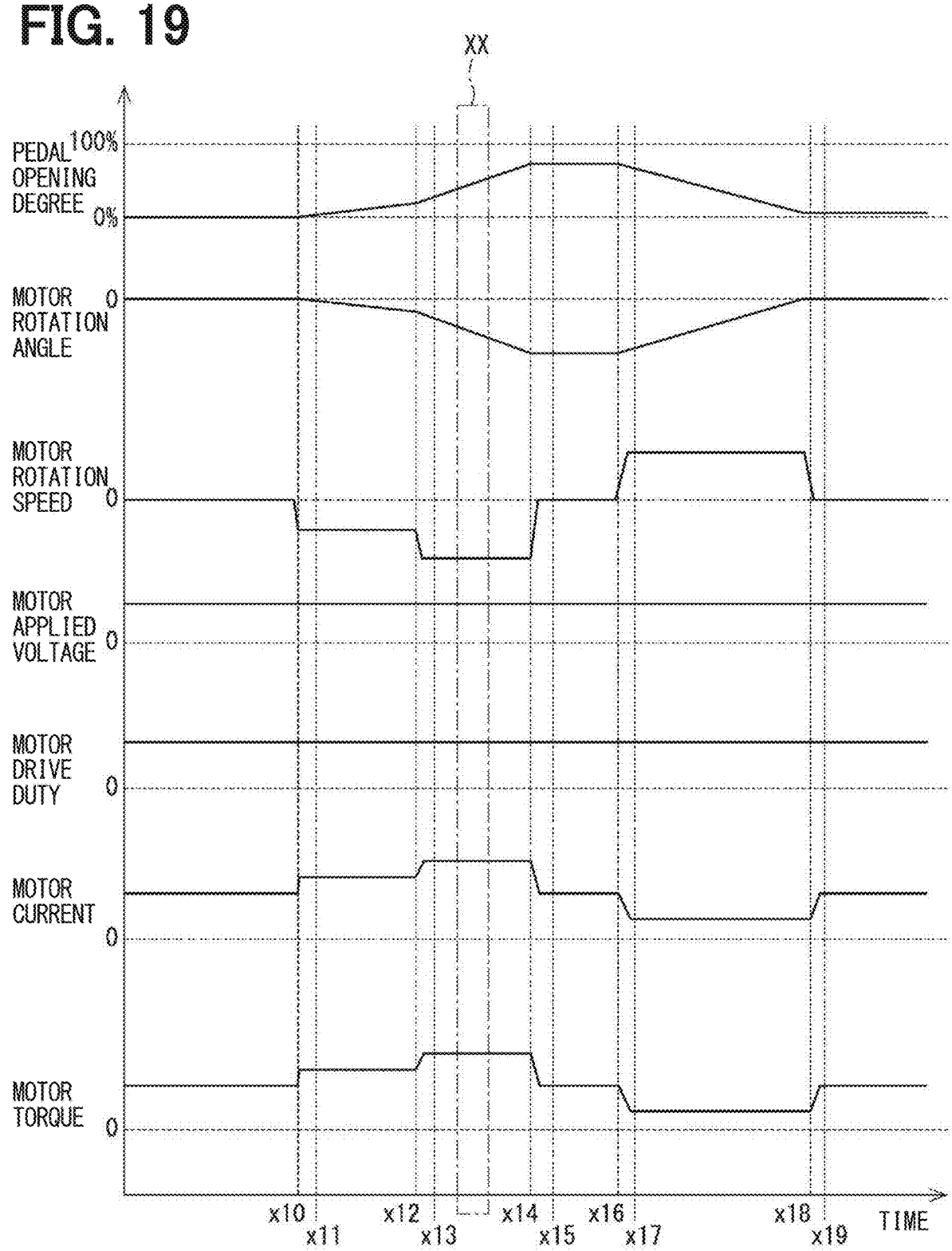
FIG. 19 is a time chart illustrating a motor control process according to a reference example.
Figure 20:
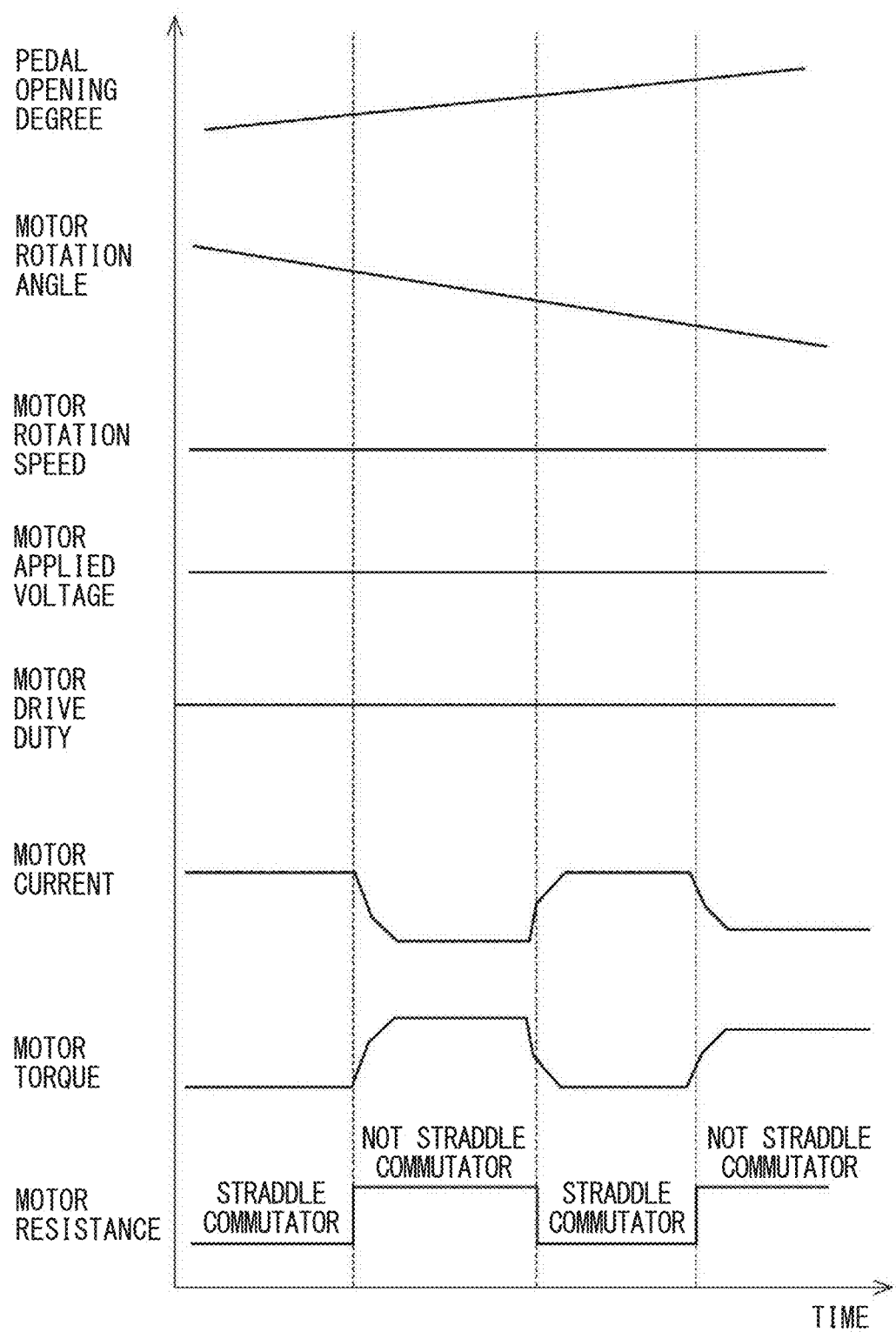
FIG. 20 is an enlarged view of a section XX in FIG. 19.

The motor control process of the present embodiment will be explained based on FIG. 11, and the motor control process of a reference example will be explained based on the time charts shown in FIGS. 19 and 20. In FIGS. 11 and 19, from the top, the pedal opening degree, the motor rotation angle, the motor rotation speed Nr, the motor applied voltage, the motor drive duty, the motor current, and the motor torque are shown. In FIG. 20, the motor resistance is additionally shown at the bottom. In the time chart, the motor rotation angle is 0° when the pedal lever 20 is fully closed, and is a value converted into a gear ratio to match the angle of the pedal lever 20. Furthermore, in FIG. 11 and the like, it is assumed that the reaction force target value Pt is constant.

As in the reference example shown in FIG. 19, when the motor drive duty is constant, when a back electromotive force is generated due to depression of the pedal lever 20, the motor current and motor torque increase, and the reaction force becomes large. Further, as shown in FIG. 20, since the motor 41 of the present embodiment is a brushed motor, the torque changes and the reaction force also changes due to the influence of changes in motor resistance depending on the rotational position of the motor 41.

As shown in FIG. 11, when the pedal lever 20 is depressed at time x10, the motor current and motor torque increase due to the back electromotive force. In the present embodiment, at time x11, which is the next calculation cycle, the motor drive duty is corrected based on the current deviation ΔI, so fluctuations in the motor current and motor torque are suppressed.

When the pedal lever 20 is further depressed at time x12, the motor drive duty is corrected based on the current deviation ΔI at time x13. Here, when the motor drive duty becomes a negative value due to the correction, the motor driver 51 is controlled to be energized in the direction opposite to the direction of applying the reaction force.

When the pedal lever 20 is held at the fully open position at time x14, the motor rotation speed becomes 0, and the motor current and motor torque become small, so at time x15, which is the next calculation cycle, the motor drive duty is corrected based on the current deviation ΔI.

When the pedal lever 20 is pressed back at time x16, the motor current and motor torque become smaller, so at time x17, which is the next calculation cycle, the motor drive duty is corrected based on the current deviation ΔI.

When the pedal lever 20 is fully closed at time x18, the motor rotation speed becomes 0 and the motor current and motor torque become large, so at time x19, which is the next calculation cycle, the motor drive duty is corrected based on the current deviation ΔI.

Regarding the pedal opening degree and the motor rotation angle, the case where the motor drive duty is constant as in the reference example of FIG. 19 is shown by a dashed line. The depression speed of the pedal lever 20 is determined by a balance between the driver's depression force and the pedal reaction force. Therefore, in the present embodiment, since the motor drive duty is corrected according to the back electromotive force, the torque generated by the motor when the pedal lever 20 is depressed can be suppressed to be smaller than in the reference example. Therefore, when the pedal force applied to the pedal lever 20 by the driver is the same, the pedal lever 20 is depressed at a faster speed in the present embodiment than in the reference example.

As explained above, the pedal device 1 includes the pedal lever 20, the actuator 40, and the control unit 60. The pedal lever 20 operates in accordance with a step-on operation. The actuator 40 can apply a reaction force that is a force in a direction of returning the pedal lever 20 by driving the motor 41. The control unit 60 includes the current command calculation section 62 that calculates the current command value based on the reaction force target value related to the reaction force applied to the pedal lever 20 and the duty calculation section 65 that calculates the duty command value Dt based on the current command value It, and controls a drive of the motor 41 based on the duty command value Dt.

The duty calculation section 65 corrects the duty command value Dt based on at least one of the motor current supplied to the motor 41 and the rotation speed of the motor 41. In the present embodiment, the duty calculation section 65 corrects the duty command value Dt based on the current deviation ΔI, which is the deviation between the current detection value Ir based on the detection value of the current sensor 52 that detects the current applied to the motor 41, and the current command value It.

Thereby, it is possible to appropriately correct the duty command value Dt based on the actual current of the motor 41 in accordance with changes in the resistance value due to harness resistance of the motor 41, contact resistance between terminals, variations in durability, etc. Further, even if the motor torque generated due to disturbance or the like varies, the duty command value Dt can be brought close to the reaction force target value Pt, so drivability is improved.

Since the motor 41 is a DC motor, the current changes due to a back electromotive voltage generated according to the motor rotation speed Nr. In the present embodiment, by using the detection current value Ir, it is possible to appropriately correct the amount of current change due to the back electromotive force. Further, since the motor 41 of the present embodiment is a brushed motor, the motor resistance changes depending on the rotation angle of the motor 41. In the present embodiment, by correcting the duty command value Dt using the current detection value Ir in the entire range of the motor rotation speed Nr, it is possible to appropriately correct the change in resistance depending on the motor rotation angle.

When the current detection value Ir is larger than the current command value It (that is, Ir>It, ΔI>0), the duty calculation section 65 corrects the duty command value Dt such that the larger the difference between the current detection value Ir and the current command value It, the smaller the duty ratio. When the current detection value Ir is less than or equal to the current command value It (that is, Ir≤It, ΔI≤0), the duty calculation section 65 may set the correction amount of the duty command value Dt to 0 (zero). In other words, in this case, the direction in which the reaction force is corrected is limited to the direction in which the reaction force becomes smaller.

When the pedal lever 20 is depressed against the reaction force, the reaction force increases due to an increase in current due to the back electromotive force, so the reaction force is reduced by decreasing the duty ratio. Thereby, the driver's pedal effort required for pedal operation can be suppressed. Furthermore, when the pedal lever 20 is pressed back, the duty command value Dt is set to the reaction force target value Pt, so drivability is improved.

When the current detection value Ir is smaller than the current command value It (i.e. Ir<It, ΔI<0), the duty calculation section 65 corrects the duty command value Dt so that the larger the difference between the current detection value Ir and the current command value It, the larger the duty ratio. When the detected current value Ir is greater than or equal to the current command value It, the duty calculation section 65 may set the correction amount of the duty command value Dt to zero (0). In other words, in this case, the direction in which the reaction force is corrected is limited to the direction in which the reaction force increases.

When the pedal lever 20 is pressed back, the reaction force becomes smaller due to a decrease in current, so the reaction force is increased by increasing the duty ratio. This suppresses over-depression of the pedal, contributing to improved fuel efficiency.

Second Embodiment

A second embodiment is shown in FIGS. 12 to 16. In the second to fourth embodiments, the motor control process is different from the above embodiments, so this point will be mainly explained. The motor control process according to the present embodiment will be described with reference to a flowchart of FIG. 12. The processes in S201 to S204 is similar to the processes in S101 to S104 in FIG. 4. Furthermore, when a standby time required for the motor rotation speed Nr to stabilize is necessary, a step similar to S105 in FIG. 4 may be provided to hold the duty command value Dt during the standby time.

In S205, which is proceeded to when it is determined that the reaction force target value Pt has not been changed (S202: NO), the control unit 60 calculates the motor rotation speed Nr. In S206, the duty calculation section 65 calculates the duty correction amount ΔD based on the motor rotation speed Nr, and corrects the duty command value Dt (see equation (5)). In the equation (5), the duty command value after correction is defined as Dt_a. The process in S207 is similar to the process in S110 in FIG. 4. The time chart is the same as that in the first embodiment, so it will be omitted.

$$Dt\_a = Dt + \Delta D \quad (5)$$

Figure 13:
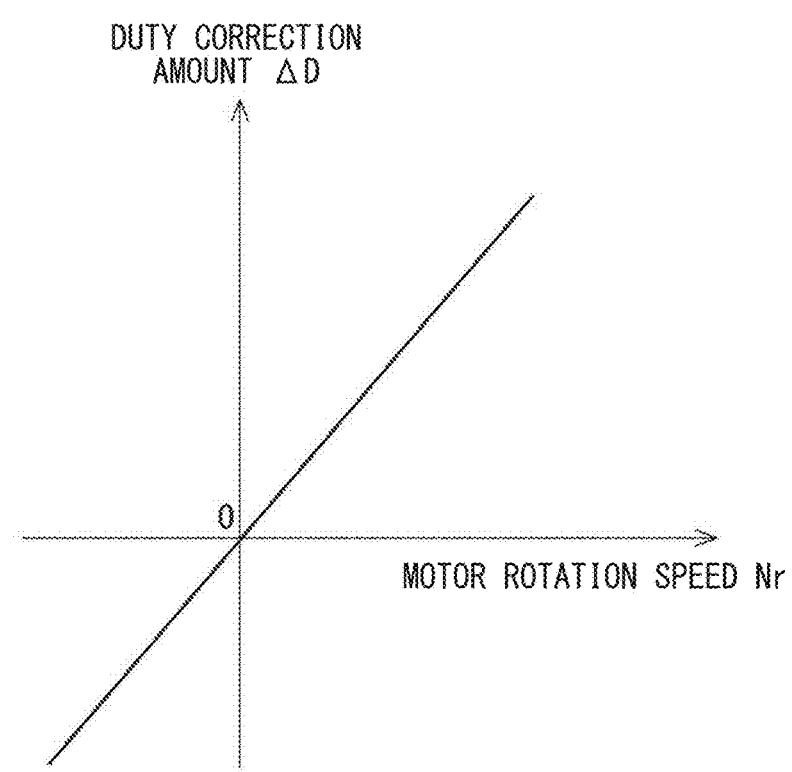
FIG. 13 is a map used for calculating a duty correction amount from the motor rotation speed in the second embodiment.
Figure 14:
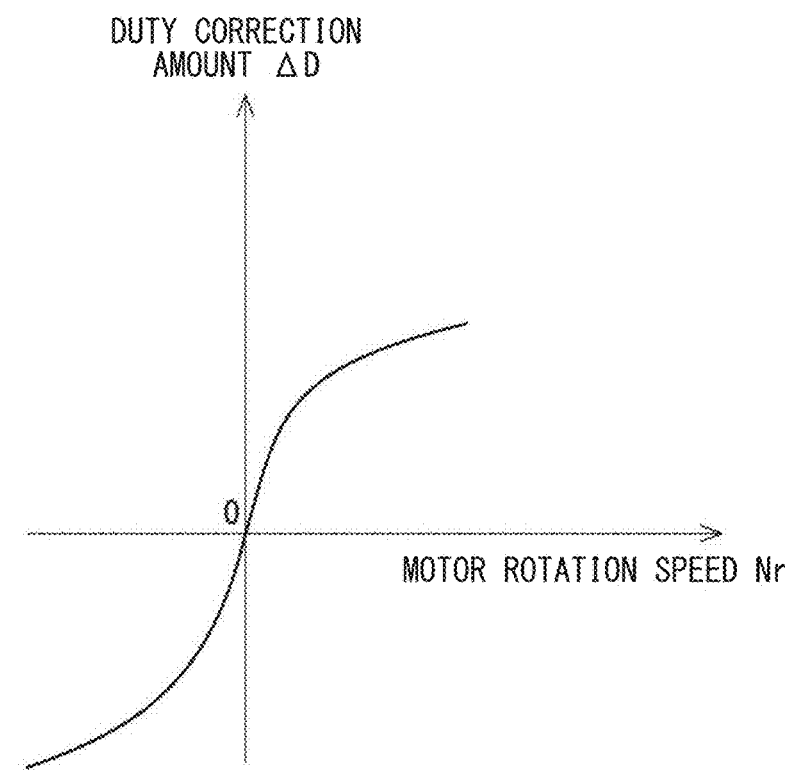
FIG. 14 is a map used for calculating a duty correction amount from the motor rotation speed in the second embodiment.

The duty correction amount ΔD will be explained based on FIGS. 13 to 16. For example, as shown in FIGS. 13 and 14, the duty correction amount ΔD is calculated so that the duty command value Dt is corrected over the entire range of motor rotation speed Nr. Thereby, the reaction force can be corrected over a wide range regardless of the rotational direction or rotation speed of the motor 41, and drivability can be improved. The duty correction amount ΔD may be calculated using a linear function as shown in FIG. 13, or may be calculated using a non-linear function as shown in FIG. 14.

Figure 15:
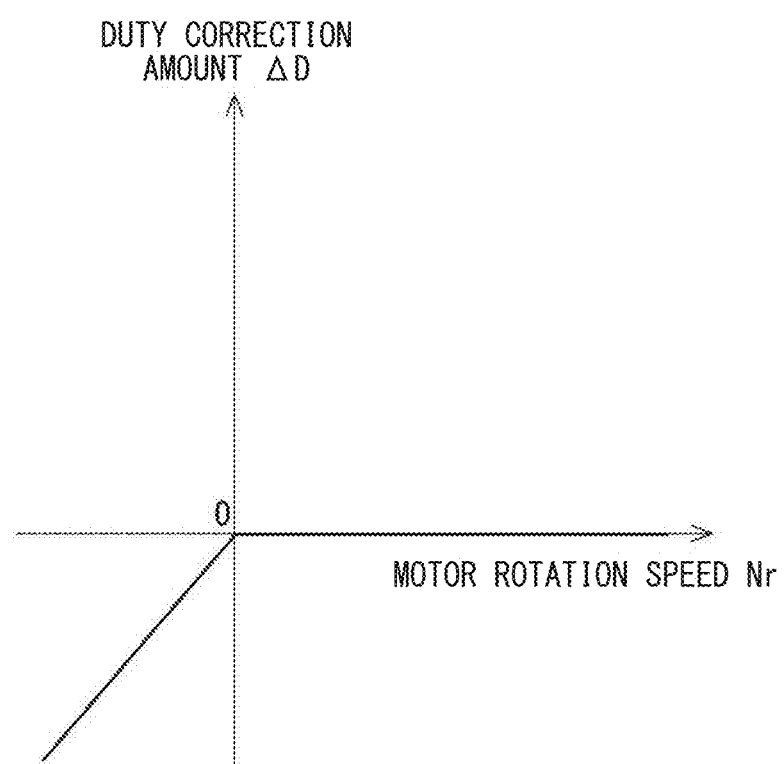
FIG. 15 is a map used for calculating a duty correction amount from the motor rotation speed in the second embodiment.

When the pedal lever 20 is depressed against the additional reaction force from the actuator 40, the motor rotation speed Nr becomes negative, the motor current increases due to the back electromotive force, and the reaction force increases more than the target reaction force. In a region where the motor rotation speed Nr is negative, the duty correction amount ΔD is set to be negative, and the corrected duty command value Dt_a is set to a value smaller than the duty command value Dt before correction. Furthermore, as shown in FIG. 15, the duty command value Dt may be corrected to reduce the reaction force when the motor rotation speed Nr is in a negative range, and the duty correction may not be performed when the motor rotation speed is in a positive range.

Figure 16:
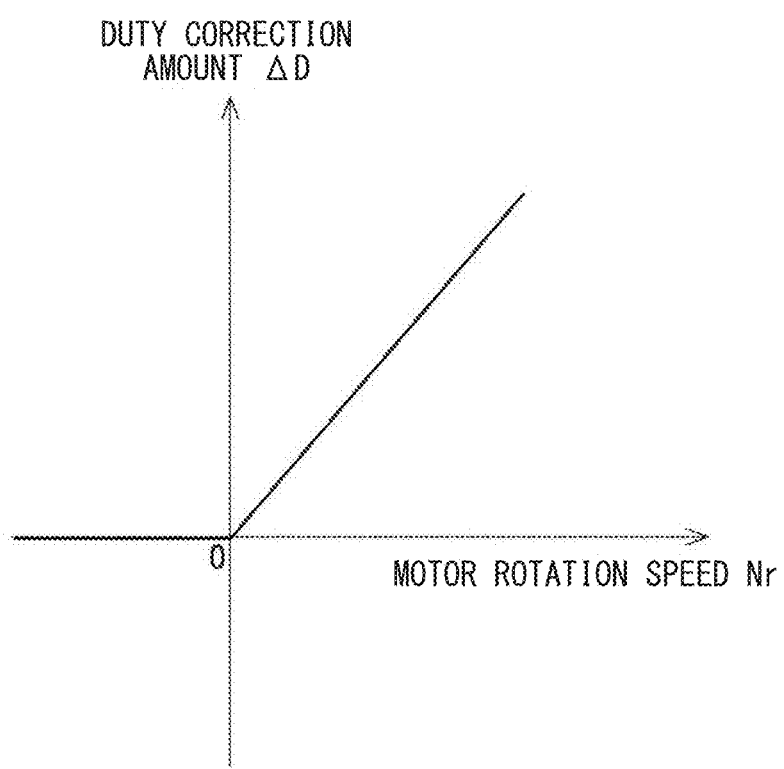
FIG. 16 is a map used for calculating a duty correction amount from the motor rotation speed in the second embodiment.

When the pedal lever 20 is pressed back, the motor rotation speed Nr becomes positive, and the reaction force is lower than the target reaction force. In a region where the motor rotation speed Nr is positive, the duty correction amount ΔD is made positive, and the corrected duty command value Dt_a is made larger than the correction duty command value Dt before correction. Furthermore, as shown in FIG. 16, the duty command value Dt is corrected to increase the reaction force when the motor rotation speed Nr is in a positive range, and the duty correction may not be performed when the motor rotation speed Nr is in a negative range.

In the present embodiment, the motor 41 is a brushed DC motor, and as the resistance value changes according to the motor rotation angle θ, the current value also changes. Therefore, in the case of control using the current value, the correction frequency or the amount of correction may increase. In the present embodiment, excessive correction can be suppressed by performing the duty correction using the motor rotation speed Nr. Furthermore, the risk of control divergence can be reduced.

In the present embodiment, the duty calculation section 65 corrects the duty command value Dt according to the motor rotation speed Nr. Specifically, when the direction of rotation of the motor 41 is opposite to the direction in which the reaction force is applied while the motor 41 is energized in the direction of applying the reaction force, that is, when the pedal lever 20 is depressed against the additional reaction force, the duty command value Dt is corrected so that the duty ratio becomes smaller as the motor rotation speed Nr becomes larger. When the rotational direction of the motor 41 is in the direction of applying the reaction force, that is, when the pedal lever 20 is pressed back, the duty command value Dt is corrected so that the duty ratio increases as the motor rotation speed Nr increases.

Thereby, the reaction force can be corrected in a wide range from a region where the motor rotation speed Nr is small to a region where it is large. In the present embodiment, since the motor 41 is a brushed motor, it is possible to appropriately correct the change in resistance depending on the rotation angle over the entire range of the motor rotation speed Nr.

When the direction of rotation of the motor 41 is opposite to the direction in which the reaction force is applied while the motor 41 is energized in the direction of applying the reaction force, that is, when the pedal lever 20 is depressed against the additional reaction force, the duty calculation section 65 corrects the duty command value Dt such that the duty ratio becomes smaller as the motor rotation speed Nr becomes larger. The duty calculation section 65 may set the correction amount of the duty command value Dt to 0 when the motor rotation speed Nr is 0 or the rotation direction of the motor 41 is the direction of applying the reaction force. In other words, in this case, the direction in which the reaction force is corrected is limited to the direction in which the reaction force becomes smaller.

When the pedal lever 20 is depressed against the reaction force, the reaction force increases due to an increase in current due to the back electromotive force, so the reaction force is reduced by decreasing the duty ratio. Thereby, the driver's pedal effort required for pedal operation can be suppressed. Furthermore, when the pedal lever 20 is pressed back, the duty command value Dt is set to the reaction force target value Pt, so drivability is improved.

When the motor 41 is energized in the direction of applying a reaction force and the rotation direction of the motor 41 is in the direction of applying the reaction force, the duty calculation section 65 corrects the duty command value Dt such that the duty ratio increases as the motor rotation speed Nr increases. The duty calculation section 65 may set the correction amount of the duty command value Dt to 0 when the motor rotation speed Nr is 0 or the rotation direction of the motor 41 is opposite to the direction of applying the reaction force. In other words, in this case, the direction in which the reaction force is corrected is limited to the direction in which the reaction force increases.

When the pedal lever 20 is pressed back, the reaction force becomes smaller due to a decrease in current, so the reaction force is increased by increasing the duty ratio. This suppresses over-depression of the pedal, contributing to improved fuel efficiency. In addition, the same effects as those of the above embodiment can be obtained.

Third Embodiment

Figure 17:
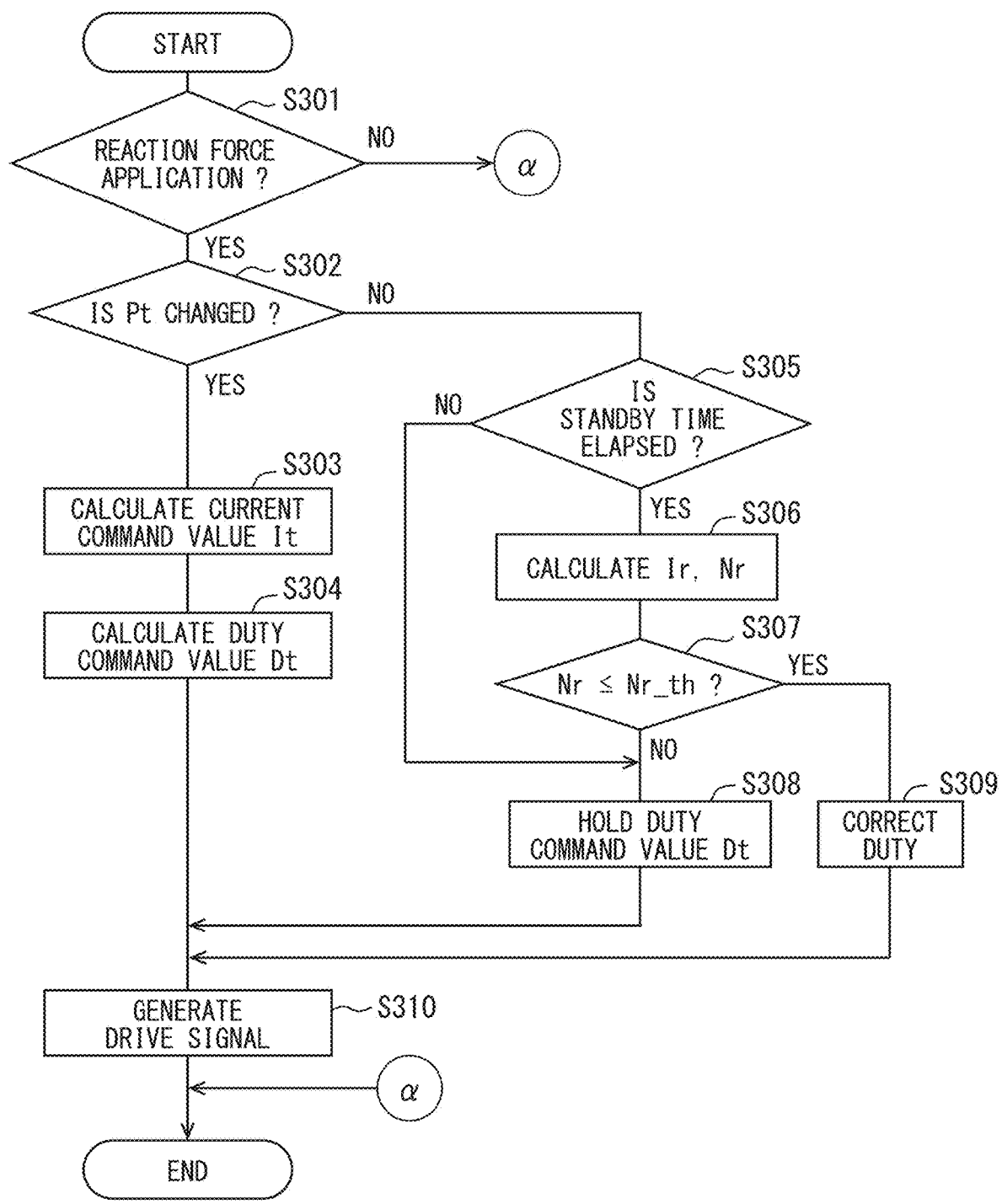
FIG. 17 is a flowchart illustrating a motor control process according to a third embodiment.

The motor control process according to the third embodiment will be explained based on the flowchart of FIG. 17. The processes from S301 to S305 are similar to the processes from S101 to S105 in FIG. 4. S305 may be omitted when the determination of the standby time is not necessary. The same applies to the fourth embodiment. In S306, the control unit 60 calculates the current detection value Ir and the motor rotation speed Nr.

In S307, the control unit 60 determines whether the motor rotation speed Nr is equal to or less than the speed determination threshold Nr_th. The speed determination threshold Nr_th is a negative value, and is set according to the rotation speed that requires correction for the torque increase due to the back electromotive force. That is, here, an affirmative determination is made when the motor rotation speed Nr is rotating in the opposite direction to the direction in which the reaction force is applied at a speed large enough to require correction due to the influence of the back electromotive force. When it is determined that the motor rotation speed Nr is greater than the speed determination threshold Nr_th (S307: NO), the process proceeds to S308 and the duty command value Dt is held. When it is determined that the motor rotation speed Nr is equal to or less than the speed determination threshold Nr_th (S307: YES), the process proceeds to S309.

In S309, the duty calculation section 65 corrects the duty command value Dt based on the current deviation ΔI. Details of the correction of the duty command value Dt are the same as in the first embodiment. Further, as in the second embodiment, the duty correction may be performed using the motor rotation speed Nr. The process in S310 is similar to the process in S110 in FIG. 4.

In the present embodiment, the depressed state of the pedal lever 20 can be reliably determined by determining whether or not to perform the duty correction based on the motor rotation speed Nr. Further, by correcting the duty command value Dt according to the current deviation ΔI, it is possible to control the additional reaction force with high accuracy.

In the present embodiment, when the rotation direction of the motor 41 is opposite to the direction of applying the reaction force and the motor rotation speed Nr is equal to or higher than the speed determination threshold, the duty calculation section 65 corrects the duty command value Dt based on the deviation between the current detection value Ir and the current command value It.

In the present embodiment, the necessity of correction of the duty command value Dt is determined based on the motor rotation speed Nr, and the duty correction amount ΔD is calculated based on the current deviation ΔI. By determining the depressed state of the pedal lever 20 based on the motor rotation speed Nr, erroneous determination of the depressed state can be prevented. Further, by performing the duty correction based on the current deviation ΔI, the reaction force can be controlled with high precision. In addition, the same effects as those of the above embodiment can be obtained.

Fourth Embodiment

Figure 18:
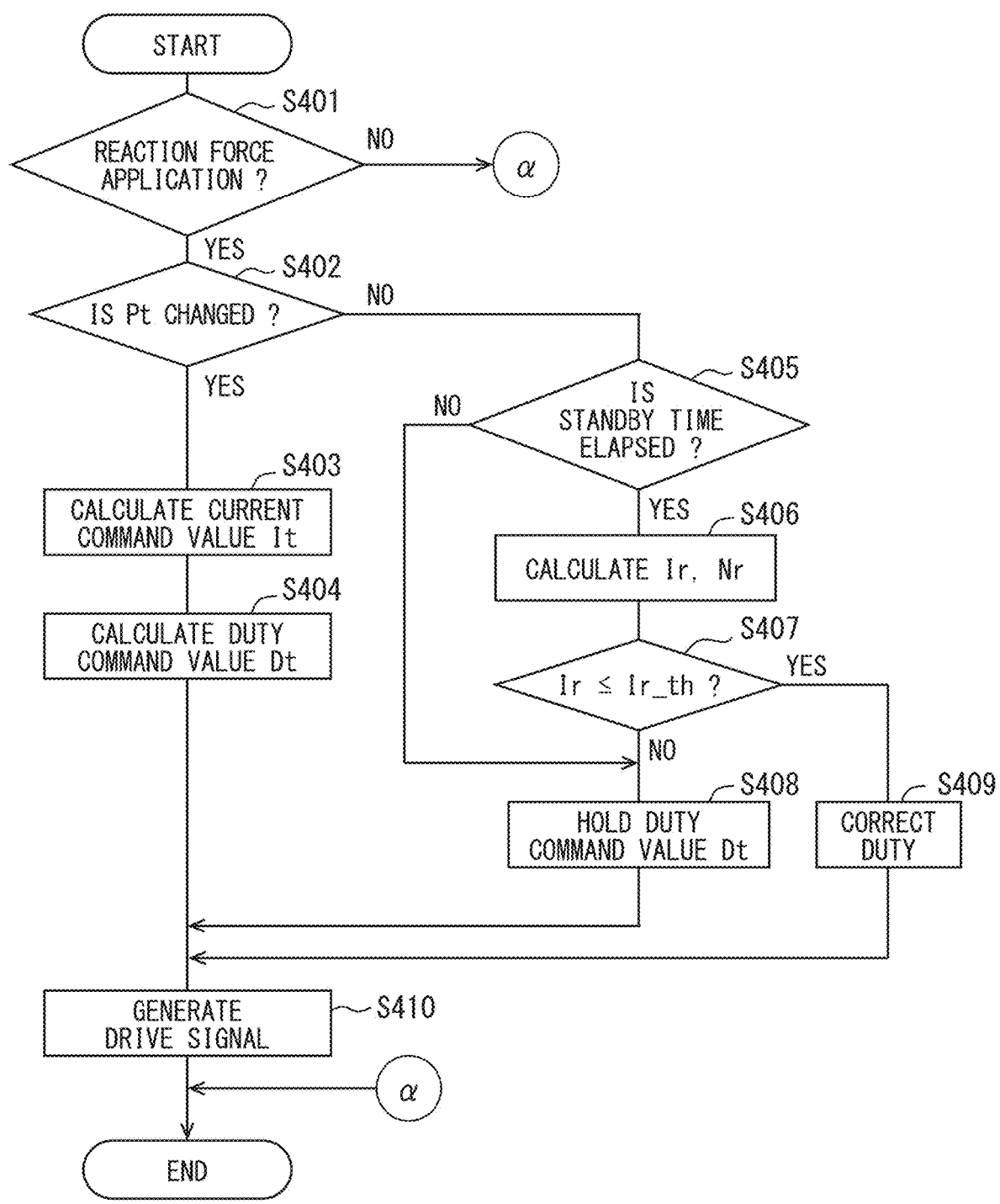
FIG. 18 is a flowchart illustrating a motor control process according to a fourth embodiment.

The motor control process according to the fourth embodiment will be explained based on the flowchart of FIG. 18. The processes from S401 to S406 are similar to the processes from S301 to S306 in FIG. 17. In S407, it is determined whether the current detection value Ir is greater than or equal to the current determination threshold Ir_th. The current determination threshold Ir_th is a positive value, and is set according to the current value that requires correction for the torque increase due to the back electromotive force. When it is determined that the current detection value Ir is smaller than the current determination threshold Ir_th (S407: NO), the process proceeds to S408 and the duty command value Dt is held. When it is determined that the current detection value Ir is equal to or greater than the current determination threshold Ir_th (S407: YES), the process proceeds to S409.

In S409, the duty calculation section 65 corrects the duty command value Dt based on the motor rotation speed Nr. Details of the correction of the duty command value Dt are the same as in the second embodiment. Further, as in the first embodiment, the duty correction may be performed using the current deviation ΔI. The process in S410 is similar to the process in S110 in FIG. 4.

In the present embodiment, when the current detection value Ir based on the detection value of the current sensor 52 that detects the current applied to the motor 41 is equal to or higher than the current determination threshold Ir_th, the duty calculation section 65 corrects the duty command value Dt based on the motor rotation speed Nr. When the noise of the position sensor 49 is relatively large, using the current detection value Ir to determine whether correction of the duty command value Dt is necessary can prevent erroneous determination of the necessity of correction. Further, by performing the duty correction based on the motor rotation speed Nr, it is possible to suppress excessive correction. Furthermore, the risk of control divergence can be reduced. In addition, the same effects as those of the above embodiment can be obtained.

Other Embodiments

In the embodiments described above, the position sensor is provided in the gear set 46 that constitutes the power transmission mechanism 45. In other embodiments, the sensor may be provided at any location as long as it can detect the rotational state of the location that can be converted into a motor rotation angle, and may be a rotation angle sensor that directly detects the rotation of the rotor of the motor 41. In the above embodiments, the motor is a brushed DC motor. In other embodiments, the type of motor may be different. The configuration, component arrangement, etc. of the power transmission mechanism may be different from the above embodiment.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A pedal device, comprising:
a pedal lever configured to operate in response to a pedal operation;
an actuator capable of applying a reaction force in a direction of returning the pedal lever when driven by a motor; and
a control unit including a current command calculation section configured to calculate a current command value based on a reaction force target value related to a reaction force applied to the pedal lever and a duty calculation section configured to calculate a duty command value based on the current command value, and being configured to control a drive of the motor based on the duty command value;
wherein
the duty calculation section
holds the duty command value, when a standby time has not elapsed since changing the reaction force target value,
determines whether it is necessary to perform a correction calculation of the duty command value based on a motor current supplied to the motor or a rotation speed of the motor, when the standby time has elapsed since changing the reaction force target value,
holds the duty command value, when it is determined that the correction calculation of the duty command value is not performed, and
calculates a correction amount of the duty command value based on at least one of the motor current supplied to the motor and the rotation speed of the motor, when it is determined that the correction calculation of the duty command value is to be performed.

2. The pedal device according to claim 1, wherein
the duty calculation section calculates the correction amount based on a deviation between a current detection value based on a detection value of a current sensor configured to detect the current applied to the motor and the current command value.

3. The pedal device according to claim 2, wherein
the duty calculation section
calculates the correction amount such that when the current detection value is larger than the current command value, a duty ratio becomes smaller as a difference between the current detection value and the current command value becomes larger, and
sets a correction amount of the duty command value to 0, when the current detection value is less than or equal to the current command value.

4. The pedal device according to claim 2, wherein
the duty calculation section
calculates the correction amount such that when the current detection value is smaller than the current command value, a duty ratio becomes larger as a difference between the current detection value and the current command value becomes larger, and
sets a correction amount of the duty command value to 0, when the current detection value is equal to or greater than the current command value.

5. The pedal device according to claim 2, wherein
when a rotation direction of the motor is opposite to a direction of applying the reaction force and the rotation speed is equal to or higher than a speed determination threshold, the duty calculation section calculates the correction amount based on a deviation between the current detection value and the current command value.

6. The pedal device according to claim 1, wherein
the duty calculation section,
in a state where the motor is energized in a direction that applies the reaction force,
calculates the correction amount such that a duty ratio becomes smaller as the rotation speed of the motor increases, when the pedal lever is depressed against an applying reaction force, and
calculates the correction amount such that the duty ratio increases as the rotation speed of the motor increases, when the pedal lever is pressed back, the correction amount is calculated.

7. The pedal device according to claim 1, wherein
the duty calculation section
calculates the correction amount such that a duty ratio becomes smaller as the rotation speed of the motor increases, when the motor is energized in the direction of applying a reaction force and a rotation direction of the motor is opposite to the direction of applying the reaction force, and
sets a correction amount of the duty command value to 0 when a rotation speed of the motor is 0 or when a rotational direction of the motor is in the direction of applying the reaction force.

8. The pedal device according to claim 1, wherein the duty calculation section calculates the correction amount such that a duty ratio becomes larger as the rotation speed of the motor increases, when the motor is energized in the direction of applying a reaction force and a rotation direction of the motor is a direction of applying the reaction force.

9. The pedal device according to claim 8, wherein the duty calculation section sets a correction amount of the duty command value to 0 when the rotation speed of the motor is 0 or the rotation direction of the motor is opposite to the direction of applying the reaction force.

10. The pedal device according to claim 1, wherein the duty calculation section calculates the correction amount based on a rotation speed of the motor when a current detection value based on a detection value of a current sensor that detects the current supplied to the motor is equal to or higher than a current determination threshold.

11. A pedal device, comprising:
a pedal lever configured to operate in response to a pedal operation;
an actuator capable of applying a reaction force in a direction of returning the pedal lever when driven by a motor; and
a computer including a processor and a memory that stores instructions configured to, when executed by the processor, cause the processor to
calculate a current command value based on a reaction force target value related to a reaction force applied to the pedal lever,
calculate a duty command value based on the current command value, and
control a drive of the motor based on the duty command value, wherein
the computer causes the processor to
hold the duty command value, when a standby time has not elapsed since changing the reaction force target value,
determine whether it is necessary to perform a correction calculation of the duty command value based on a motor current supplied to the motor or a rotation speed of the motor, when the standby time has elapsed since changing the reaction force target value,
hold the duty command value, when it is determined that the correction calculation of the duty command value is not performed, and
calculate a correction amount of the duty command value based on at least one of the motor current supplied to the motor and the rotation speed of the motor, when it is determined that the correction calculation of the duty command value is to be performed.

12. The pedal device according to claim 11, wherein the processor is configured to:
calculate the correction amount based on a deviation between a current detection value based on a detection value of a current sensor configured to detect the current applied to the motor and the current command value.

13. The pedal device according to claim 12, wherein the processor is configured to:
calculate the correction amount such that when the current detection value is larger than the current command value, a duty ratio becomes smaller as a difference between the current detection value and the current command value becomes larger, and
set a correction amount of the duty command value to 0, when the current detection value is less than or equal to the current command value.

14. The pedal device according to claim 12, wherein the processor is configured to:
calculate the correction amount such that when the current detection value is smaller than the current command value, a duty ratio becomes larger as a difference between the current detection value and the current command value becomes larger, and
set a correction amount of the duty command value to 0, when the current detection value is equal to or greater than the current command value.

15. The pedal device according to claim 12, wherein the processor is configured to:
when a rotation direction of the motor is opposite to a direction of applying the reaction force and the rotation speed is equal to or higher than a speed determination threshold, calculate the correction amount based on a deviation between the current detection value and the current command value.

16. The pedal device according to claim 11, wherein the processor is configured to:
in a state where the motor is energized in a direction that applies the reaction force,
calculate the correction amount such that a duty ratio becomes smaller as the rotation speed of the motor increases, when the pedal lever is depressed against an applying reaction force, and
calculate the correction amount such that the duty ratio increases as the rotation speed of the motor increases, when the pedal lever is pressed back, the correction amount is calculated.

17. The pedal device according to claim 11, wherein the processor is configured to:
calculate the correction amount such that a duty ratio becomes smaller as the rotation speed of the motor increases, when the motor is energized in the direction of applying a reaction force and a rotation direction of the motor is opposite to the direction of applying the reaction force, and
set a correction amount of the duty command value to 0 when a rotation speed of the motor is 0 or when a rotational direction of the motor is in the direction of applying the reaction force.

18. The pedal device according to claim 11, wherein the processor is configured to:
calculate the correction amount such that a duty ratio becomes larger as the rotation speed of the motor increases, when the motor is energized in the direction of applying a reaction force and a rotation direction of the motor is a direction of applying the reaction force.

19. The pedal device according to claim 18, wherein the processor is configured to:
set a correction amount of the duty command value to 0 when the rotation speed of the motor is 0 or the rotation direction of the motor is opposite to the direction of applying the reaction force.

20. The pedal device according to claim 11, wherein processor is configured to:
calculate the correction amount based on a rotation speed of the motor when a current detection value based on a detection value of a current sensor that detects the current supplied to the motor is equal to or higher than a current determination threshold.

* * * * *